(12) United States Patent
Yu

(10) Patent No.: US 9,807,996 B1
(45) Date of Patent: Nov. 7, 2017

(54) BUG EATER

(71) Applicant: Simon Siu-Chi Yu, Oakland, CA (US)

(72) Inventor: Simon Siu-Chi Yu, Oakland, CA (US)

( * ) Notice: Subject to any disclaimer, the term of this patent is extended or adjusted under 35 U.S.C. 154(b) by 0 days.

(21) Appl. No.: 15/269,173

(22) Filed: Sep. 19, 2016

Related U.S. Application Data

(60) Provisional application No. 62/392,341, filed on May 28, 2016.

(51) Int. Cl.

| | |
|---|---|
| *B64C 13/20* | (2006.01) |
| *A01M 5/02* | (2006.01) |
| *A01M 1/06* | (2006.01) |
| *A01M 1/22* | (2006.01) |
| *A01M 1/08* | (2006.01) |
| *A01M 1/02* | (2006.01) |
| *A01M 1/10* | (2006.01) |
| *A01M 29/00* | (2011.01) |
| *G05D 1/02* | (2006.01) |
| *B64C 39/02* | (2006.01) |
| *B64D 45/00* | (2006.01) |

(52) U.S. Cl.
CPC .............. *A01M 5/02* (2013.01); *A01M 1/023* (2013.01); *A01M 1/06* (2013.01); *A01M 1/08* (2013.01); *A01M 1/106* (2013.01); *A01M 1/223* (2013.01); *A01M 29/00* (2013.01); *B64C 39/024* (2013.01); *B64D 45/0015* (2013.01); *G05D 1/0202* (2013.01); *B64C 2201/12* (2013.01)

(58) Field of Classification Search
USPC .... 244/190, 17.23, 17.11; 43/140, 107, 112, 43/139
See application file for complete search history.

(56) References Cited

U.S. PATENT DOCUMENTS

| | | | | |
|---|---|---|---|---|
| 9,381,646 | B1* | 7/2016 | Fryshman | .............. B25J 9/1697 |
| 2014/0303814 | A1* | 10/2014 | Burema | ............... A01B 79/005 |
| | | | | 701/3 |
| 2016/0198088 | A1* | 7/2016 | Wang | ................. H04N 5/23238 |
| | | | | 348/36 |
| 2016/0260207 | A1* | 9/2016 | Fryshman | ............. G06T 7/0008 |
| 2016/0307448 | A1* | 10/2016 | Salnikov | ................ A01B 79/02 |
| 2016/0334276 | A1* | 11/2016 | Pluvinage | ............. G01J 3/2823 |
| 2017/0029099 | A1* | 2/2017 | Chen | ....................... B64C 27/08 |
| 2017/0031365 | A1* | 2/2017 | Sugumaran | ........... B64C 39/024 |

\* cited by examiner

*Primary Examiner* — Christopher P Ellis
(74) *Attorney, Agent, or Firm* — Lyman Moulton, Esq.

(57) ABSTRACT

A drone with a high-voltage trap seeks, identifies, pursues and destroys flying insects within a patrolling area. During its passive attracting mode, the drone lands on a designated ground site and attracts insects with light, sound, and scents. Once insects are lured, the high voltage screens trap will immediately electrocute targeted insects. In its active offensive mode, the drone hovers closer to insect nests using its high-velocity propellers, producing strong downdraft jet streams to disturb the nest and force insects, such as mosquitoes and the like, to evacuate their nest. Once insects are airborne, the drone pursues fleeing insects from below or behind, making use of its propellers and vacuuming the fleeing insects. Slow flying insects that come in contact with the high-voltage electrified screens are immediately electrocuted. Insects that are vacuumed into the fast-spinning propellers blades are knocked down and killed. A rectified charging pad recharges the drone batteries.

21 Claims, 6 Drawing Sheets

Fig. 3 High voltage Double layer screen

Fig. 4 High voltage single layer screen

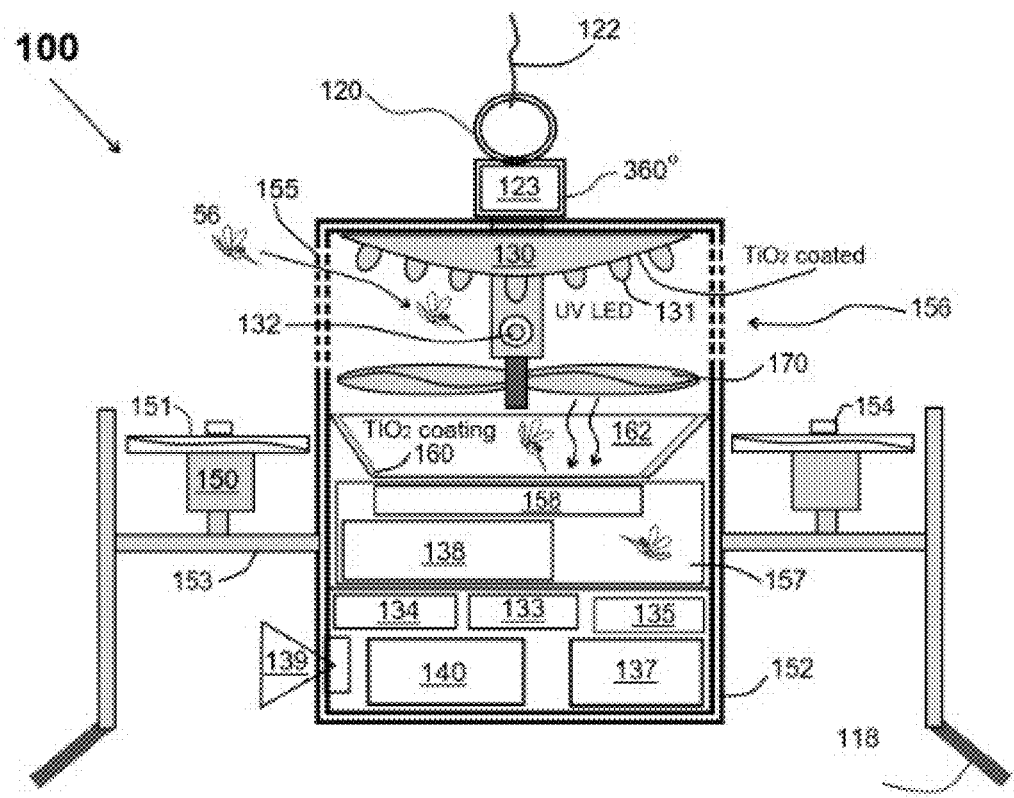
Fig.5
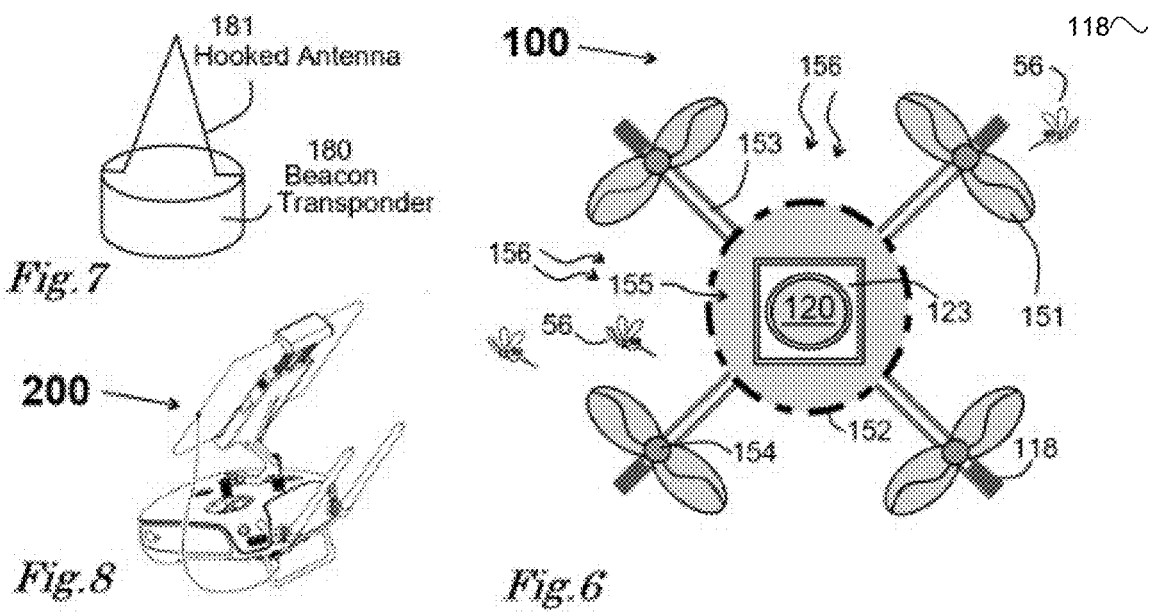
Fig.7
Fig.8
Fig.6

BUG EATER

CROSS-REFERENCE TO RELATED APPLICATION

This application claims priority to earlier filed U.S. Patent Application 62/392,341 titled 'Bug Eater' filed May 28, 2016 by Simon Siu-Chi Yu and claims the benefit of the earlier filing date and is incorporated herein by reference in its entirety.

BACKGROUND OF THE INVENTION

This invention is directed toward the eradication of harmful flying insects. Flying insects are difficult to eliminate once they are airborne. Flies are particularly agile; it is almost impossible to take them down by swinging a towel. The present invention is concentrated on killing mosquitoes in large quantities since mosquitoes are more harmful to humans than other insects due to the many mosquito-transmitted diseases.

There are devices available on the market to deal with mosquitoes such as sticky glue coated tape, bed nets, traps, systems using greenhouse gas CO2 to lure mosquitoes into a death trap and also the controversial DDT chemical spray. The latest innovation still undergoing research is the use of lasers to zap mosquitoes. However, all of these tools are passive devices or systems which are not effective in controlling the mosquito population. There are reports stating that laser equipped systems may be impractical as most mosquito-infested areas are in the poorer counties that do not have electricity and they require trained personnel to operate. Spraying DTT is currently the most effective eradication method at present but comes with negative environmental impact.

According to the World Health Organization, an estimated 200 million cases of malaria caused by mosquitoes and an estimated 600,000 malaria-related deaths occurred worldwide in 2012. Governments and aid agencies have set up many programs to distribute anti-malarial drugs, insecticides, and bed nets in endemic areas and these helpful tools have curbed the spread of malaria through the rural parts of the world. However, these existing measures and technology have only held the epidemic at bay. To have a real chance of conquering this disease, a new approach is needed.

SUMMARY OF THE INVENTION

A disclosed unmanned aerial vehicle drone (UAVD) includes an insect suction and eradication module 210 comprising at least one suction impeller and one of a constricting electrocution screen and a constricting mechanical trap. The UAVD also includes a control and communications module 220 comprising an electronic central processing unit (CPU), a wireless communication unit, an electronic camera and audio A/V unit and a bus configured to interconnect all drone modules. The UAVD additionally includes a navigation module 230 comprising a set of 360 degree obstacle avoidance sensors and positioning unit (GPS) configured to autonomously direct the drone to avoid obstacles while in flight. The UAVD further includes an insect attraction module 240 comprising scented cartridges, a visible lighting unit, a flashing UV (Ultraviolet) light unit, and a CO2 (Carbon Dioxide) generator. The UAVD yet includes a security module 250 comprising an acoustic sounder to safeguard the drone from being stolen when stationed on the ground via acoustic deterrents and a failsafe in the event the deterrent fails.

A method for eradicating flying insects via the disclosed UAVD comprises eradicating flying insects via a drone insect suction and eradication module comprising at least one suction impeller and one of a constricting electrocution screen and a constricting mechanical trap. The method also includes interconnecting all drone modules via a control and communications module comprising an electronic central processing unit (CPU), a wireless communication unit, an electronic camera and audio A/V unit and a bus configured to interconnect all drone modules. The method additionally includes autonomously directing a drone via a drone navigation module comprising a set of 360 degree obstacle avoidance sensors and positioning unit (GPS) configured to avoid obstacles while in flight.

The method further includes attracting flying insects via a drone insect attraction module comprising scented cartridges, a visible lighting unit, a flashing UV (Ultraviolet) light unit, and a CO2 (Carbon Dioxide) generator. The method yet includes protecting the drone via a drone security module comprising an acoustic sounder to safeguard the drone from being stolen when stationed on the ground via acoustic deterrents and a failsafe in the event the deterrents fail.

Other aspects and advantages of embodiments of the disclosure will become apparent from the following detailed description, taken in conjunction with the accompanying drawings, illustrated by way of example of the principles of the disclosure herein.

BRIEF DESCRIPTION OF THE DRAWINGS

FIG. 3 is a schematic view of a high voltage double layer screen for the UAVD in accordance with an embodiment of the present disclosure.

FIG. 4 is a schematic view of a high voltage single layer screen for the UAVD in accordance with an embodiment of the present disclosure.

FIG. 5 is a cutaway diagrammatic illustration of a UAV Drone with a suction screen and impeller for killing flying insects in accordance with an embodiment of the present disclosure.

FIG. 6 is a top elevational view of the UAV Drone of FIG. 5 for killing flying insects in accordance with an embodiment of the present disclosure.

FIG. 7 is a perspective view of a beacon transponder with hooked antenna for the UAVD in accordance with an embodiment of the present disclosure.

FIG. 8 is a perspective view of a base station controller and display for the UAV D in accordance with an embodiment of the present disclosure.

Figure 1:
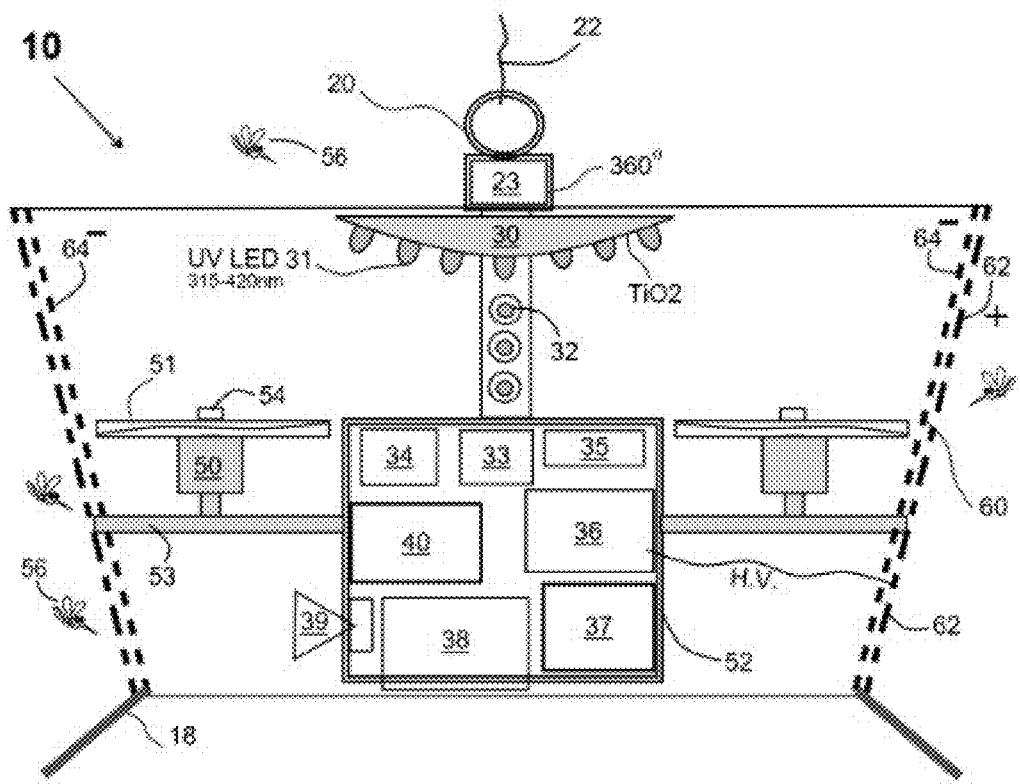
FIG. 1 is a cutaway diagrammatic illustration of a UAV Drone with a surrounding high voltage screen for killing flying insects in accordance with an embodiment of the present disclosure.

Throughout the description, similar and same reference numbers may be used to identify similar and same elements in the several embodiments and drawings. Although specific embodiments of the invention have been illustrated, the invention is not to be limited to the specific forms or arrangements of parts so described and illustrated. The scope of the invention is to be defined by the claims appended hereto and their equivalents.

DETAILED DESCRIPTION

Reference will now be made to exemplary embodiments illustrated in the drawings and specific language will be used herein to describe the same. It will nevertheless be understood that no limitation of the scope of the disclosure is thereby intended. Alterations and further modifications of the inventive features illustrated herein and additional applications of the principles of the inventions as illustrated herein, which would occur to a person of ordinary skill in the relevant art and having possession of this disclosure, are to be considered within the scope of the invention.

Throughout the present disclosure, the terms "constrict" and "narrow" refer to a funnel-like structure configured to direct insects, air flow and other things in a certain direction from a wider space into a less wide space. Also the term 'electrocution' refers to a mostly lethal electrical event based on the amount of current passed through an insect or other animate thing disposed between two voltage points on an electrocution screen. Also, the term UAVD refers to an unmanned aerial vehicle drone and in the present disclosure is synonymous with drone or UAV Drone etc.

The present disclosed invention uses an unmanned base flying vehicle drone fitted with high voltage electrified screens, chemical scents, lights, sound, a suction fan, video camera, global positioning system, Wi-Fi, docking beacon homing and tracking system. It is the most advanced tool to deal with this problem.

FIG. 1 is a cutaway diagrammatic illustration of a UAV Drone with a surrounding high voltage screen for killing flying insects in accordance with an embodiment of the present disclosure. The unmanned flying vehicle drone (UAV-Unmanned Aerial Vehicle) drone 10 is integrated with an insect killing apparatus including a gyroscope assisted, battery 37 powered, multi-propeller 51 driven flying drone. A cylindrical cage 60 surrounding the drone is electrified by a high voltage inverter module 36 configured for eradicating insects. The high voltage cage 60 is protected by a cage guard (not depicted) to prevent accidental touching. A camera with Wi-Fi 34, live streams video via an antenna 22 to a base station controller 200 (not depicted). A GPS (Global Position System) 35 sets a flight path to reach a destination and guides the drone 10 back to base.

A set of 360 degree obstacle avoidance sensors 23 and gyroscopes along with the camera 20 and onboard CPU (Central Processing Unit) 33 directs the drone 10 to avoid obstacles while in flight. The CPU 33 accepts apps (applications) available for download and updates. An attractant module 38 includes an Octenol and Lactic acid scented cartridge, a visible lighting module 32 and a CO2 (Carbon Dioxide) generator configured to attract insects to the UAVD in conjunction with the UV (ultra violet) light module 31. An acoustic sounder 39 or alarm is included to safeguard the drone 10 from being stolen when stationed on the ground and resting on the support legs 18.

A dedicated drone battery 37 and an accessories battery pack 40 ensure the drone 10 reserves adequate energy to return to base depending on an indicator signal or a timeout of a period of time. The battery packs 37 and 40 are rechargeable with solar panels (not depicted). A remote controller base station manages drone activities by communicating with the drone via WI-FI 34. Also depicted are a drone housing 52, a drone structural frame 53, a drone motor 50 and a drone motor shaft 54 for the drone propeller blades 51. The drone is integrated with a housing 52 and drone structural frame 53 structurally supports the high voltage cage 60.

A visible lighting module includes color changing LED (light emitting diode) 32 configured to generate a wide spectrum of stationary or flashing visible light, including reds, greens, and blues to mimic human activity to attract insects to fly closer and investigate. A stationary or flashing UV (Ultraviolet) light module 31 is included in an embodiment. The module has a convex reflector 30 that generates between 315 nm to 420 nm wavelength of UV light to attract insects. A CO2 (Carbon Dioxide) generator comprises the surface of the convex reflector 30 that is coated with TiO2 (Titanium Dioxide). The ultraviolet irradiates onto the convex reflector 30, causing release of CO2 to further attract insects.

Figure 2:
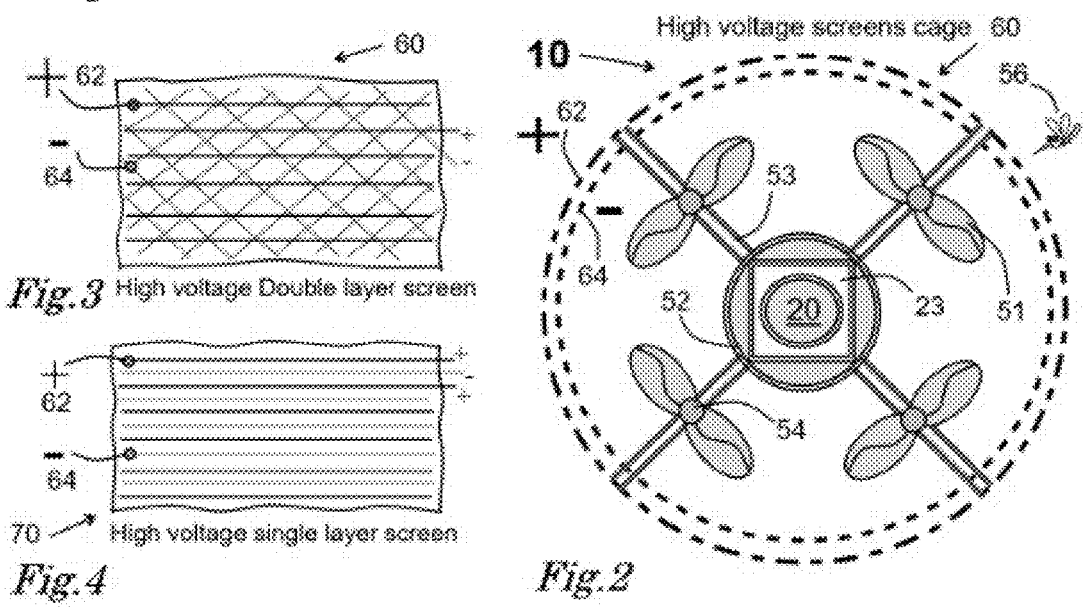
FIG. 2 is a top elevational view of the UAV Drone of FIG. 1 for killing flying insects in accordance with an embodiment of the present disclosure.

FIG. 2 is a top elevational view of the UAV Drone of FIG. 1 for killing flying insects in accordance with an embodiment of the present disclosure. Reference numbers may be used for same and similar limitations to other figures contained in the present disclosure. The cage is depicted circular but may also be square, oval and spherical and other geometries depending on the application and design considerations. When an insect lands on a screen, the screens will bridge via the insect and cause a discharge current onto and through the insect, instantly electrocuting the insect. The mesh size of an exterior screen opening is larger than the mesh size of an interior screen opening to facilitate bridging. The top opening of the cylindrical cage is larger than its bottom opening, so the cage is slanted inward to allow deceased insects to quickly fall off the cylindrical cage.

FIG. 3 is a schematic view of a high voltage double layer screen for the UAVD in accordance with an embodiment of the present disclosure. The cylindrical cage 60 may include two layers of metal screens 62 and 64 that are spaced apart creating an exterior screen 62 and an interior screen 64. The screens may contain insulation material in between, such as plastic standoffs, to prevent the screens from making physical contact with each other. The exterior screen 62 is energized with positive potential voltage while the interior screen 64 is energized with negative potential voltage or vice versa.

FIG. 4 is a schematic view of a high voltage single layer screen for the UAVD in accordance with an embodiment of the present disclosure. An embodiment of the cylindrical cage may include a single layer of metal screen that is formed by winding two separate metal wires, wrapped around an insulation core in an interleaving fashion. The two interleaved wires are spaced apart, creating a parallel and alternating relationship that is energized with a positive and negative voltage placed across the respective wires. Therefore, each wire at any point with respect to its neighboring two wires is oppositely energized. When an insect lands on any wire, it will bridge the screen and cause a discharge current onto the insect, instantly electrocuting the insect. A top opening of the cylindrical cage is larger than its bottom opening, so the cage is slanted inward to allow deceased insects to quickly fall off the cylindrical cage. The cylindrical cage surrounds and encircles the drone body without touching the tips of the propellers spaced apart from the cage.

The cage guard is installed to surround the exterior face of the exterior high voltage screen. The guard is perforated with openings which are much larger than the mesh openings of the exterior screen to allow insects to fly there through. The guard is made from non-electrical conducting material to prevent accidental hand touching of the high voltage cylindrical cage.

A high voltage inverter module delivers high energy to the cylindrical cage. The positive and negative voltages are high enough to electrocute insects but not high enough to cause arcing between the screens. The high voltage is within a range of 450 to 10,000 volts.

A live video streaming camera broadcasts real time video and images back to its remote controller base station 200 via P2P, FPV, RPV formats and the like. The camera stores images on the drone for real time analyze of intended target by using facial and object recognition tracking as well as color histogram software. The camera is able to distinguish which types of insects are being targeted.

A set of 360 degree obstacle avoidance sensors include infrared or ultrasound (sonar) with aid from the camera to alert the drone in order to avoid collisions with obstacles.

An acoustic sounder announces prerecorded messages or relays real time message sent from remote base operator. The sounder warns intruders who come too close to drone landing site while the camera takes pictures around its vicinity immediately for future recovery if drone is stolen. The drone flies back to base if the warning message fails to deter the intruder. The controller sends a message through sounder and then sends a command to a kill switch to cause the drone to become inoperable if stolen. The sounder frequency ranges from infrasound to ultrasound. The sounder uses infrasound and ultrasound to repel unwanted targets.

FIG. 5 is a cutaway diagrammatic illustration of a UAV Drone with a suction screen and impeller for killing flying insects in accordance with an embodiment of the present disclosure. The depicted drone 100, among other things, is a gyroscope assisted, battery powered, multi-propeller driven flying drone. A fan assisted suction trap is integrated into the drone 100 to eradicate insects. A fan shroud 162 routes insects into a one way trap 158 where the insects are trapped in a detachable tray 157. A camera 120 with Wi-Fi 134 streams live video via an antenna 122 to a base station controller 200 (not depicted).

A GPS (Global Position System) 135 sets a flight path to reach a predetermined destination and guides the drone 100 back to base. A set of 360 degree obstacle avoidance sensors 123 and gyroscopes (not depicted) along with the camera 120 and onboard CPU (Central Processing Unit) 133 directs the drone 100 to avoid obstacles while in flight. The CPU 133 accepts apps (applications) at a data port available for download and update. An attractant module 138 includes an Octenol and Lactic acid scented cartridge. A visible lighting module 132, a UV (Ultraviolet) light module 131, and a CO2 (Carbon Dioxide) generator are used to attract insects. An acoustic sounder 139 safeguards the drone 100 from being stolen when stationed on the ground. A dedicated drone battery 137 and a separate battery pack 140 for accessories ensures the drone 100 reserves adequate energy to return to base. The battery packs are rechargeable with solar panels (not depicted).

A fan 170 assisted suction trap pulls insects 56 into the trap 158 with directional air currents created by the rotating fan 170 when insects 56 fly close to trap for their investigation. The fan 170 runs on battery power. The suction fan 170 can be temporally switched off when drone 100 encounters beneficial insects. A fan shroud 162 directs captured insects to a one way trap 158 and holds them in a detachable tray 157 until they perish. The tray 157 is removable for cleaning. The shroud 162 is coated with TiO2.

Also depicted are a drone housing 152, a drone structural frame 153, a drone motor 150 and a drone motor shaft 154 for the drone propeller blades 151. The drone is integrated with the housing 152 and the drone structural frame 153 structurally supports the integrated components thereof. Additionally depicted are the suction grid 155, the air current direction 156, the TIO2 coating 160, the wireless transponder 180 and the hooked antenna 181.

The UAVD may be charged at home. A pad 80 sized to match the support legs 18 of the drone may be provided. When the drone 10, 100 lands on the pad 80, or is otherwise situated on the pad 80, an electric current starts to conduct through legs 18, 118 and rectify module 81 charging the batteries 37, 40, 137 and 140. The pad 80 is square and partitioned in two sections: one section for a positive voltage and the other section for a negative or ground voltage. Its surface is electrically conductive. Leg 18, 118 has at least a metal tip 19 for conduction.

FIG. 6 is a top elevational view of the UAV Drone of FIG. 5 for killing flying insects in accordance with an embodiment of the present disclosure. Reference numbers may be used for same and similar limitations to other figures contained in the present disclosure.

FIG. 7 is a perspective view of a beacon transponder with hooked antenna for the UAVD in accordance with an embodiment of the present disclosure. The transponder beacon 180 helps precisely guide the drone 100 and 10 to a predetermined site. The transponder beacon 180 emits a radio frequency that is recognizable by the drone 10 and 100. The drone hovers closely to the beacon and can follow its owner/operator movement, thus providing an insect free pathway. The drone homes in to the beacon which was positioned earlier. The beacon also has a hooked antenna 181 which is extended upwards to conveniently attach to the drone and move to other locations.

The remote controller base station 200 manages drone activities. The controller communicates with drone via WI-FI. The transponder beacon helps precisely guide the drone to site; and the drone integrated with a housing that structurally supports the fan assisted suction trap. The housing provides ingress openings 155 large enough for insects being sucked in. The drone can be stationed indoor and outdoor and can fly autonomously or with an operator controller.

FIG. 8 is a perspective view of a base station controller 200 and display for the UAVD in accordance with an embodiment of the present disclosure. A remote control base station comprises joysticks, an antenna, a transponder, a radio transceiver, a video monitor, a drone status display, a microphone, a gyroscope, and a set of sensor calibration switches. The remote control station can be substituted with a smart phone.

Figure 9:
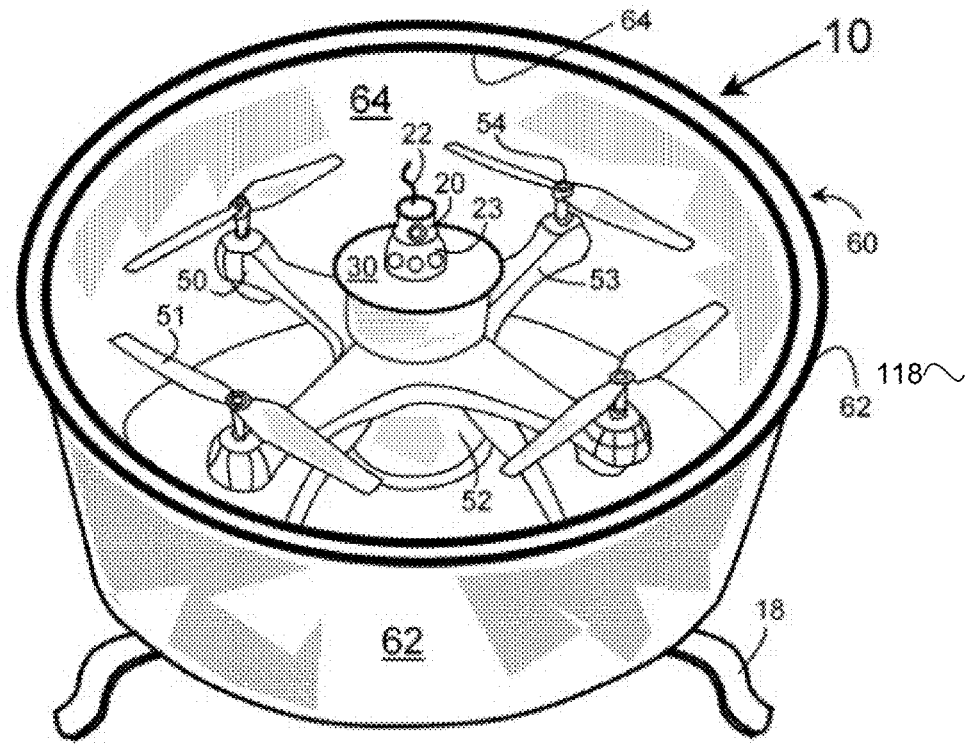
FIG. 9 is a top side perspective view of the UAV Drone of FIG. 1 in accordance with an embodiment of the present disclosure.

FIG. 9 is a top side perspective view of the UAV Drone of FIG. 1 in accordance with an embodiment of the present disclosure. Reference numbers may be used for same and similar limitations to other figures contained in the present disclosure.

Figure 10:
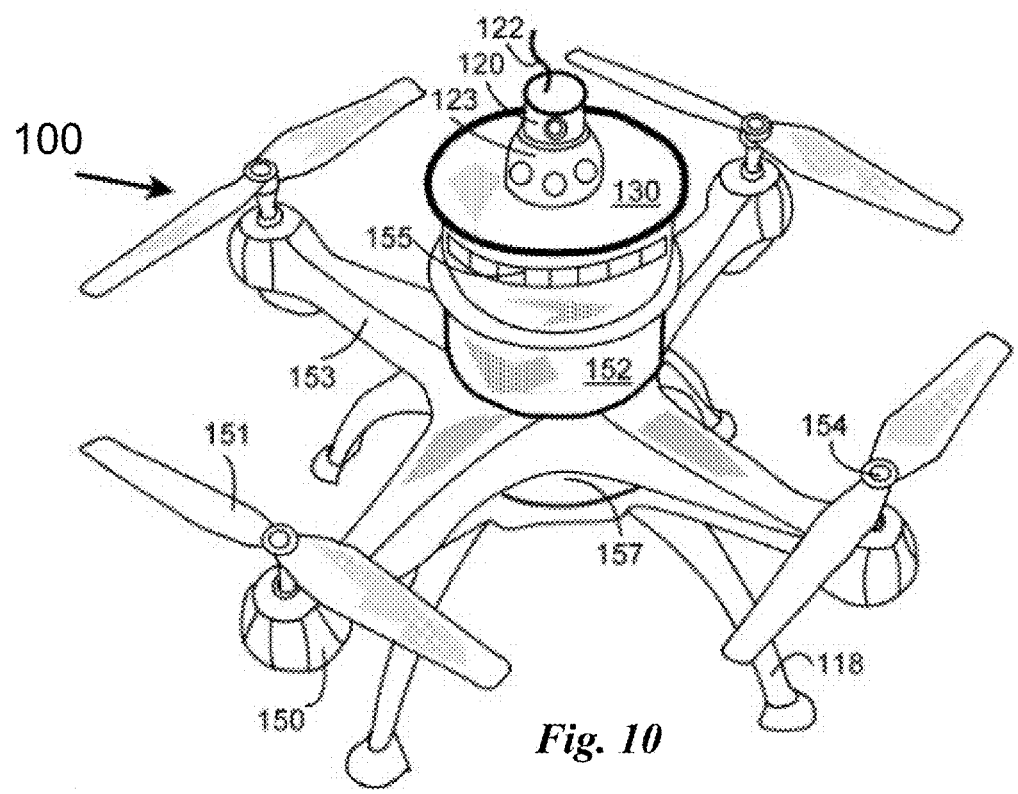
FIG. 10 is a top side perspective view of the UAV Drone of FIG. 5 in accordance with an embodiment of the present disclosure.

FIG. 10 is a top side perspective view of the UAV Drone of FIG. 5 in accordance with an embodiment of the present disclosure. Reference numbers may be used for same and similar limitations to other figures contained in the present disclosure.

Figure 11:
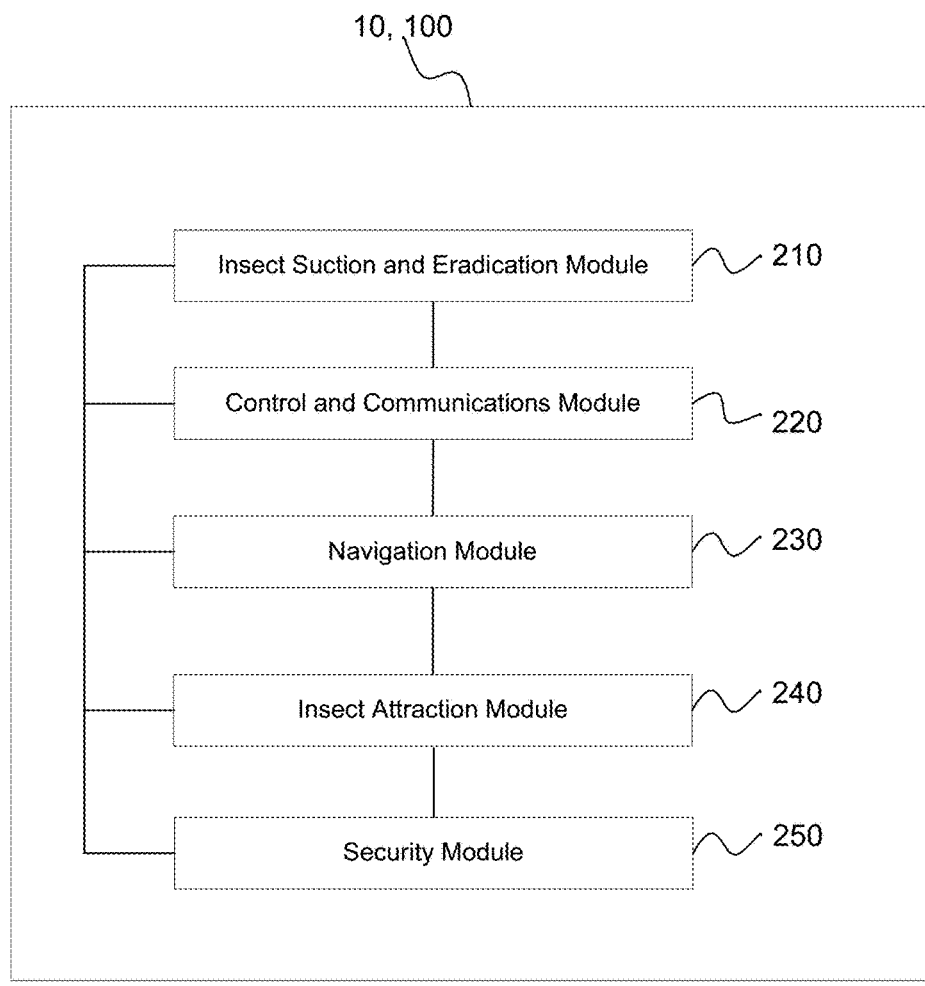
FIG. 11 is a block diagram of a UAVD adapted for eradicating flying insects in accordance with an embodiment of the present disclosure.

FIG. 11 is a block diagram of a UAVD adapted for eradicating flying insects in accordance with an embodiment of the present disclosure. The disclosed UAVD includes an Insect Suction and Eradication module 210, a Control and Communications module 220, a Navigation module 230, an Insect Attraction Module 240 and a Drone Security module 250 as disclosed herein. All drone modules are electrically interconnected via the Control and Communications module 220.

Figure 12A:
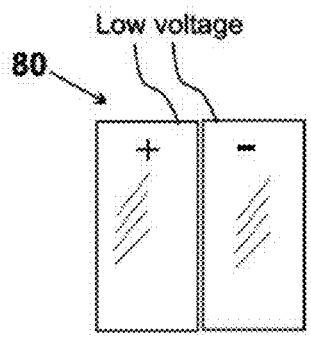
FIG. 12A is a top view of a drone charge pad in accordance with an embodiment of the present disclosure.

FIG. 12A is a top view of a drone charge pad 80 in accordance with an embodiment of the present disclosure. The unmanned UAVD system further includes a charge station at home base. A pad sized to match the support legs of the drone may be provided. When the drone lands on the pad, or is otherwise situated on the pad, an electric current starts to conduct through legs charging the batteries. The pad is square and partitioned in two sections: one section for a positive voltage and the other section for a negative or ground voltage. Its surface is electrically conductive. Each leg has at least a metal tip 19 for conduction.

Figure 12B:
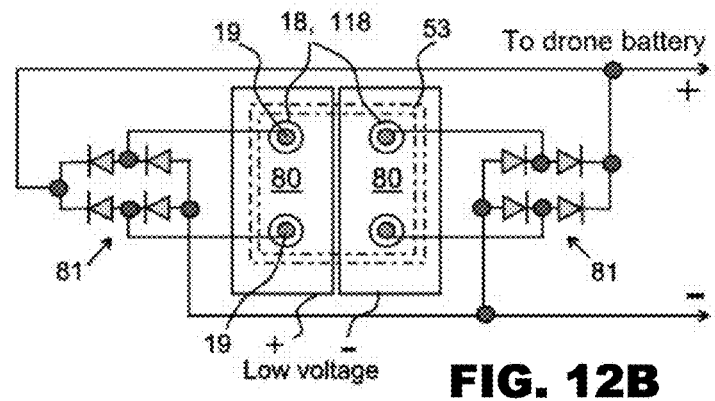
FIG. 12B is a schematic diagram of the drone charge pad including rectifiers in accordance with an embodiment of the present disclosure.

FIG. 12B is a schematic diagram of the drone charge pad 80 including rectifiers in accordance with an embodiment of the present disclosure. The rectifiers 81 allow current to flow to the drone but do not allow any backwash current from the drone into the charging power supply. Thus, the drone may land in any orientation across the power supply pads and self-corrects or allows current to charge into the drone batteries. The double tapped diode or thyristor configuration allows a completed charging circuit from a positive terminal to a negative terminal through either a top diode or thyristor to a bottom diode or thyristor as depicted in the schematic. The rectifying circuits may be included in the charging pad circuits or in the drone itself.

Figure 13:
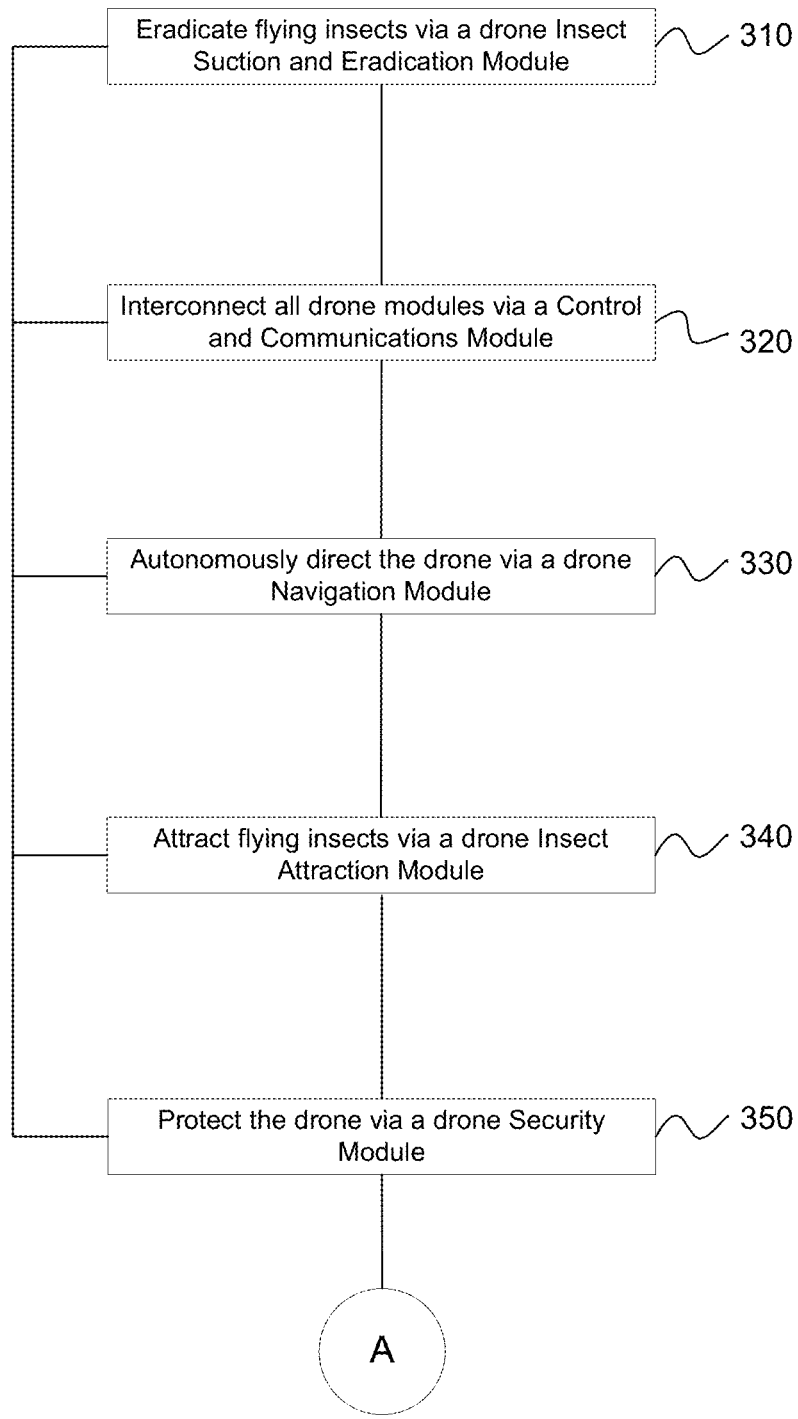
FIG. 13 is a block diagram of a method for eradicating flying insects via the disclosed UAV Drone in accordance with an embodiment of the present disclosure.

FIG. 13 is a block diagram of a method for eradicating flying insects via the disclosed UAV Drone in accordance with an embodiment of the present disclosure. The method includes eradicating 310 flying insects via a drone insect suction and eradication module. The method also includes interconnecting 320 all drone modules via a control and communications module. The method additionally includes autonomously directing 330 the drone via a drone navigation module. The method further includes attracting 340 flying insects via a drone insect attraction module. The method yet includes protecting 350 the drone via a drone security module.

Figure 14:
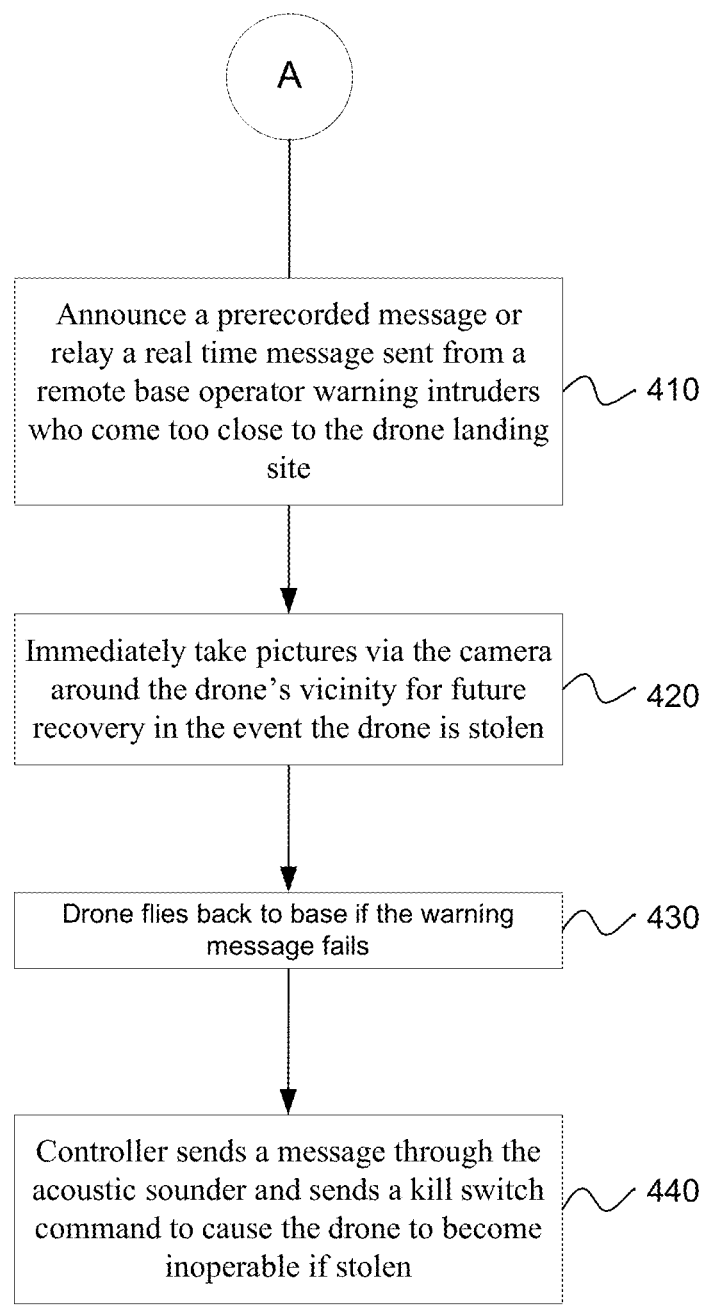
FIG. 14 is a block diagram of a method of security for the disclosed UAV Drone in accordance with an embodiment of the present disclosure.

FIG. 14 is a block diagram of a method of security for the disclosed UAV Drone in accordance with an embodiment of the present disclosure. The method embodiment includes announcing 410 a prerecorded warning message or relay a real time message sent from a remote base operator warning intruders who come too close to the drone landing site. The method embodiment also includes immediately 420 taking pictures via the camera around the drone's vicinity for future recovery in the event the drone is stolen. The method embodiment additionally includes the drone flying 430 back to base if the warning message fails. The method embodiment further includes the controller sending 440 a message through the acoustic sounder and sending a kill switch command to cause the drone to become inoperable if stolen.

The drone can be stationed indoor and outdoor and may also fly alone or work as a group to fly in a formation to eradicate mosquitoes from a wide area. The drone may fly autonomously or with the aid of an operator controller.

The drone autonomously clears the insects inside the house prior to its owner return home. The live streaming camera can send a viewing of the house and clearing process to the owner. The drone uses its propellers to blast the interior walls and floor with air, forcing all insects to became airborne so the drone can eradicate them. Outdoors, the drone will disturb insect nests with the propeller's downdraft, forcing insects to evacuate. The drone also eradicates outdoor insects while they are airborne.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Notwithstanding specific embodiments of the invention have been described and illustrated, the invention is not to be limited to the specific forms or arrangements of parts so described and illustrated. The scope of the invention is to be defined by the claims and their equivalents included herein or by reference to a related application.

What is claimed is:

1. An unmanned aerial vehicle drone (UAVD), comprising:
    an insect suction and eradication module comprising at least one suction impeller and one of a funneling electrocution screen and a narrowing mechanical trap;
    a control and communications module comprising an electronic central processing unit (CPU), a wireless communication unit, an electronic camera and audio A/V unit and a bus configured to interconnect all drone modules;
    a navigation module comprising a set of 360 degree obstacle avoidance sensors and positioning unit (GPS) configured to autonomously direct the drone to avoid obstacles while in flight;
    an insect attraction module comprising scented cartridges, a visible lighting unit, a UV (Ultraviolet) light unit, and a $CO_2$ (Carbon Dioxide) generator; and
    a security module comprising an acoustic sounder to safeguard the drone from being stolen when stationed on the ground via acoustic deterrents and a failsafe in the event the deterrent fails.

2. The unmanned UAVD of claim 1, wherein the funneling electrocution screen is a cylindrical cage configured to have a top opening larger than a bottom opening and the wall there between is slanted inward from the top to the bottom to allow deceased insects to quickly fall off the cylindrical cage.

3. The unmanned UAVD of claim 1, wherein the funneling electrocution screen is a cylindrical cage comprising two layers of metal screens spaced apart and an insulation there between to prevent the screens from making physical contact wherein a mesh size of an exterior screen opening is larger than a mesh size of an interior screen opening.

4. The unmanned UAVD of claim 1, wherein the funneling electrocution screen is a cylindrical cage comprising a single layer metal screen formed by two separate metal wires wrapped around an insulation core in a spaced apart interleaved fashion, where each wire at any point with respect to its neighboring two wires is oppositely energized.

5. The unmanned UAVD of claim 1, wherein an electrically non-conducting cage guard surrounds an exterior of the funneling electrocution screen, defining openings which are larger than the mesh openings of the electrocution screen to allow an insect to fly there through.

6. The unmanned UAVD of claim 1, wherein the camera broadcasts real time video and images back to a remote controller base via P2P, FPV, RPV formats and the like and stores images on the drone for real time analysis of intended targets using object recognition tracking as well as color histogram software to distinguish which types of insects are being targeted.

7. The unmanned UAVD of claim 1, wherein a set of 360 degree obstacle avoidance sensors (OAS) comprise infrared or ultrasound sonar and three dimensional laser scanner with aid from the camera to alert the drone to autonomously avoid collisions with obstacles.

8. The unmanned UAVD of claim 1, wherein the visible lighting unit is adapted to generate a wide spectrum of stationary or flashing visible lights, including reds, greens, and blues configured to mimic human activity to attract insects to fly closer and investigate the lights.

9. The unmanned UAVD of claim 1, wherein the UV (Ultraviolet) light unit comprises a stationary or flashing convex reflector that generates between 315 nm to 420 nm wavelength of UV light to attract insects.

10. The unmanned UAVD of claim 1, wherein a surface of the $CO_2$ generator comprises a convex reflector coated with $TiO_2$ (Titanium Dioxide) configured to react with ultraviolet light irradiated onto the convex reflector to cause release of $CO_2$ to further attract insects.

11. The unmanned UAVD of claim 1, wherein the acoustic sounder generates audio to announce a prerecorded message or relay a real time message sent from a remote base operator to warn intruders and produces infrasound and ultrasound to repel unwanted targets.

12. The unmanned UAVD of claim 1, further comprising a dedicated drone battery and an accessories battery pack ensure the drone reserves adequate energy to return to base, the battery packs are rechargeable with solar panels.

13. The UAVD of claim 1, wherein the insect suction and eradication module comprises the suction impeller configured to pull flying insects into a trap with directional air currents created by the impeller when insects fly close to trap for their investigation, wherein the suction impeller is temporally switched off when drone encounters beneficial insects.

14. The UAVD of claim 1, further comprising a fan shroud adapted to direct captured insects to a one way trap and hold them in a tray until they perish, the tray is removable for cleaning and the shroud coated with $TiO_2$.

15. A Unmanned Aerial Vehicle Drone (UAVD) System, comprising:
   an insect suction and eradication module comprising at least one impeller and one of a funneling electrocution screen and a narrowing mechanical trap;
   a control and communications module comprising an electronic central processing unit (CPU), a wireless communication unit, an electronic camera and audio A/V unit and a bus configured to interconnect all drone modules;
   a navigation module comprising a set of 360 degree obstacle avoidance sensors and positioning unit (GPS) configured to autonomously direct the drone to avoid obstacles while in flight;
   an insect attraction module comprising scented cartridges, a visible lighting unit, a stationary or flashing UV (Ultraviolet) light unit, and a $CO_2$ (Carbon Dioxide) generator; and
   a security module comprising an acoustic sounder to safeguard the drone from being stolen when stationed on the ground via acoustic deterrents and a failsafe in the event the deterrent fails.

16. The unmanned UAVD of claim 15, further comprising a transponder beacon in wireless communication with the drone, the transponder beacon comprising a hook extended upwards to conveniently attach to the drone and be moved to a location by the drone.

17. The unmanned UAVD of claim 15, further comprising a remote control base station including joysticks, an antenna, a transponder, a radio transceiver, a video monitor, a drone status display, a microphone, a gyroscope, and a set of sensor calibration switches, the remote control station configured to be substitutable with a smart phone.

18. The unmanned UAVD system of claim 15, further comprising an electrical charging pad configured in two sections for a positive voltage and a negative voltage or ground voltage and a double tapped diode or thyristor configuration configured to allow a completed charging circuit from a positive terminal to a negative terminal through either a top diode or thyristor to a bottom diode or thyristor.

19. A method for eradicating flying insects, the method comprising:
   eradicating flying insects via a drone insect suction and eradication module comprising at least one suction impeller and one of a funneling lethal electrocution screen and a narrowing lethal mechanical trap;
   interconnecting all drone modules via a control and communications module comprising an electronic central processing unit (CPU), a wireless communication unit, an electronic camera and audio AN unit and a bus configured to interconnect all drone modules;
   autonomously directing a drone via a drone navigation module comprising a set of 360 degree obstacle avoidance sensors and positioning unit (GPS) configured to avoid obstacles while in flight;
   attracting flying insects via a drone insect attraction module comprising scented cartridges, a visible lighting unit, a flashing UV (Ultraviolet) light unit, and a $CO_2$ (Carbon Dioxide) generator; and
   protecting the drone via a drone security module comprising an acoustic sounder to safeguard the drone from being stolen when stationed on the ground via acoustic deterrents and a failsafe in the event the deterrents fail.

20. The method for eradicating flying insects of claim 19, further comprising blasting a nest of insects and blasting a house's interior walls and floor with air via the drone's propellers and forcing all insects to became airborne for eradication.

21. The method for eradicating flying insects of claim 19, wherein the failsafe includes a kill switch adapted to cause the drone to become inoperable if stolen.

* * * * *